US008909801B2

(12) United States Patent
Yuan et al.

(10) Patent No.: US 8,909,801 B2
(45) Date of Patent: Dec. 9, 2014

(54) GRAPHIC SHARING

(75) Inventors: Zhijun Yuan, Hangzhou (CN); Yangfan Yu, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 153 days.

(21) Appl. No.: 13/522,247

(22) PCT Filed: Apr. 20, 2012

(86) PCT No.: PCT/US2012/034567
§ 371 (c)(1),
(2), (4) Date: Jul. 13, 2012

(87) PCT Pub. No.: WO2012/148825
PCT Pub. Date: Nov. 1, 2012

(65) Prior Publication Data
US 2013/0046813 A1 Feb. 21, 2013

(30) Foreign Application Priority Data

Apr. 25, 2011 (CN) .......................... 2011 1 0103855

(51) Int. Cl.
G06F 15/16 (2006.01)
H04L 29/08 (2006.01)
H04L 29/06 (2006.01)
G06F 3/14 (2006.01)
G06T 15/00 (2011.01)
H04N 21/61 (2011.01)

(52) U.S. Cl.
CPC .................. H04L 29/08 (2013.01); H04L 69/24 (2013.01); G06F 3/14 (2013.01); G06T 15/005 (2013.01); G06F 3/1454 (2013.01); H04N 21/6175 (2013.01); H04L 67/26 (2013.01); H04L 29/06 (2013.01); H04L 29/06027 (2013.01); H04N 21/6125 (2013.01)

USPC ........... 709/229; 709/203; 709/228; 345/418; 715/203

(58) Field of Classification Search
CPC ......... H04L 69/24; H04L 69/42; H04L 29/06; H04L 29/06027; H04L 29/08; H04L 65/4084; H04L 67/26; G06T 15/005; G06F 3/14; G06F 3/1454; H04N 21/6125; H04N 21/6175; H04N 21/8543
USPC .......................................... 709/203, 225, 229
See application file for complete search history.

(56) References Cited

U.S. PATENT DOCUMENTS 6,105,055 A 8/2000 Pizano et al.
7,933,956 B2 4/2011 Hon et al.
(Continued)

FOREIGN PATENT DOCUMENTS

CN 101179406 A 5/2008
CN 101577007 A 11/2009

OTHER PUBLICATIONS

Conditions affecting performance of a WebEx session, 2010, WebEx Network Bandwidth, White Paper, 15 pages.*
(Continued)

Primary Examiner — Oleg Survillo
(74) Attorney, Agent, or Firm — Lee & Hayes, PLLC

(57) ABSTRACT

A graphics provider terminal samples, through a graphical interface provided by a Canvas specification, a graphic generated by a web browser of the graphics provider terminal based on the Canvas specification to obtain graphics information according to a preset sampling rate. The graphics provider terminal packs the graphics information to obtain a message packet based on a preset graphics sharing agreement; and sends the message packet to a graphics exchange server through a persistent connection between the graphics provider terminal and the graphics exchange server. The graphics exchange server unpacks the message packet to obtain the graphics information and sends the graphics information to a graphics receiver terminal through a persistent connection between the graphics receiver terminal and the graphics exchange server.

20 Claims, 7 Drawing Sheets

(56) References Cited

U.S. PATENT DOCUMENTS

| | | |
|---|---|---|
| 2002/0101431 A1 | 8/2002 | Forney et al. |
| 2003/0014476 A1* | 1/2003 | Peterson .................. 709/203 |
| 2003/0016215 A1* | 1/2003 | Slupe ....................... 345/213 |
| 2005/0021626 A1 | 1/2005 | Prajapat et al. |
| 2005/0278641 A1 | 12/2005 | Mansour et al. |
| 2006/0282855 A1 | 12/2006 | Margulis |
| 2007/0174410 A1 | 7/2007 | Croft et al. |
| 2010/0082131 A1* | 4/2010 | Baier et al. .................. 700/83 |
| 2010/0121919 A1 | 5/2010 | Hepworth et al. |
| 2010/0257233 A1 | 10/2010 | Auvray et al. |
| 2010/0268813 A1* | 10/2010 | Pahlavan et al. ........... 709/224 |
| 2010/0281107 A1* | 11/2010 | Fallows et al. ............. 709/203 |
| 2011/0004888 A1 | 1/2011 | Srinivasan et al. |
| 2011/0126130 A1 | 5/2011 | Lieb et al. |
| 2011/0173256 A1 | 7/2011 | Khalatian |

OTHER PUBLICATIONS

PCT Search Report and Written Opinion mailed Jun. 29, 2012 for PCT application No. PCT/US12/34567, 9 pages.

Chinese Office Action for Applicaton No. 201110103855.3, mailed on Jun. 26, 2014, a counterpart foreign application of U.S. Appl. No. 13/522,247, 16 pages.

* cited by examiner

GRAPHIC SHARING

CROSS REFERENCE TO RELATED PATENT APPLICATIONS

This application is a national stage application of an international patent application PCT/US12/34567, filed Apr. 20, 2012, which claims foreign priority to Chinese Patent Application No. 201110103855.3 filed on 25 Apr. 2011, entitled "Graphic Sharing Method, System, and Terminal," which applications are hereby incorporated by reference in their entirety.

TECHNICAL FIELD

The present disclosure relates to a field of internet technology, and, more specifically, to a method, a system, and a terminal for graphic sharing.

BACKGROUND

HTML5 is a next generation HTML standard supported by web browsers, which provides more functionalities to a developer. HTML5 includes several sub-standards, such as WebSocket, Worker, WebSQL, Canvas, etc. Currently, multiple web browsers including Internet Explorer (IE), Firefox, Chrome, and Safari support these standards.

In the above-mentioned standards, Canvas is the drawing sub-standard in HTML5, which is mainly used to generate different kinds of 3D and 2D graphics. Therefore, the developers can use Canvas to create games, and even create a system platform. In recent years, the applications of web browsers have been exploding and the requirements for drawing graphics have been increasing. Thus, the application and development of Canvas has been undergoing extensive research. Currently, the graphic generation technology based on Canvas is still a cutting-edge technology, and its implementations continue to improve. Hardware graphics acceleration has been used to achieve faster operations on graphics.

Under the current techniques, there is a need to remotely share graphics in certain circumstances (such as when remotely sharing a desktop image). The current techniques use controls to implement graphics sharing among different computers. Specifically, a control that is mainly used to perform graphics sharing needs to first be downloaded to a computer. The control captures graphics in the computer and sends it to another computer. As the current techniques are not capable of performing cross-browser graphics transmission, different controls are required to develop for different web browsers, thereby consuming lost of manpower and resources.

SUMMARY

The example embodiments of the present disclosure provide a graphic sharing method and system to transmit graphics cross-browser. The example embodiments of the present disclosure also provide a terminal.

The example embodiments of the present disclosure provide a method for sharing graphics. According to a preset sampling rate, a graphics provider terminal, through a graphical interface provided by the Canvas specification, samples a graphic generated by a web browser of the graphics provider terminal based on the Canvas specification to obtain graphics information. The graphics provider terminal, based on a preset graphics sharing agreement, packs the obtained graphics information to obtain a message packet, and then sends the message packet to the graphics exchange server through a persistent connection between the graphics provider terminal and the graphics exchange server. The graphics exchange server unpacks the message packet to retrieve the graphics information, and sends the graphics information to a graphics receiver terminal through a persistent connection between the graphics receiver terminal and the graphics exchange server.

The web browser of the graphics provider terminal may also install some software such as plug-ins to support interactive vector graphics and web animation standards, such as Flash. The graphics provider terminal sends the message packet to the graphics exchange server using the persistent connection. For example, the graphics provider terminal uses a persistent connection established by a FlashSocket interface, which is provided by a Flash-supported message communication standard, to send the message packet to the graphics exchange server.

In another example, the graphics provider terminal may encode the message packet, and uses a persistent connection established by a WebSocket interface, which is provided by a browser-supported message communication standard, to send the message packet to the graphics exchange server.

The graphics exchange server uses the persistent connection with the graphics receiver terminal to send the graphics information to the graphics receiver terminal. For example, from handshake information sent by the graphics receiver terminal, the graphics exchange server determines the message communication standard supported by the graphics receiver terminal. When it is determined that the message communication standard supported by the graphics receiver terminal is a Flash-supported message communication standard, the graphics exchange server packs the graphics information into a message packet based on the preset graphics sharing agreement, and sends it to the graphics receiver terminal by using the persistent connection established by the FlashSocket interface, which is provided by the Flash-supported message communication standard. When it is determined that the message communication standard supported by the graphics receiver terminal is a message communication standard supported by the browser in the graphics receiver terminal, the graphics exchange server packs the graphics information into a message packet based on the preset graphics sharing agreement, and sends it to the graphics receiver terminal by using the persistent connection established by the WebSocket interface, which is provided by the browser-supported message communication standard at the web browser of the graphics receiver terminal.

The preset sampling rate may be set up by multiple methods. For example, the graphics provider terminal sets up the sampling rate based on a frequency refresh rate of the graphics receiver terminal that is included in the handshake information sent by the graphics exchange server.

The example embodiments of the present disclosure provide a system for sharing graphics. The system includes a graphics provider terminal, a graphics receiver terminal, and a graphics exchange server. According to a preset sampling rate, the graphics provider terminal, through a graphical interface provided by the Canvas specification, samples a graphic generated by a web browser of the graphics provider terminal based on the Canvas specification to provide graphics information. The graphics provider terminal, based on a preset graphics sharing agreement, packs the obtained graphics information to obtain a message packet, and then sends the message packet to the graphics exchange server through a persistent connection between the graphics provider terminal and the graphics exchange server. The graphics exchange server unpacks the message packet to retrieve the graphics information, and sends the graphics information to a graphics receiver terminal through a persistent connection between the graphics receiver terminal and the graphics exchange server.

The example embodiments of the present disclosure also provide a terminal that includes a sampling unit, a packing unit, and a sending unit. According to a preset sampling rate, the sampling unit, through a graphical interface provided by the Canvas specification, samples a graphic generated by a web browser of the terminal based on the Canvas specification to obtain graphics information. The packing unit, based on a preset graphics sharing agreement, packs the obtained graphics information to obtain a message packet. The sending unit sends the message packet obtained from the packing unit to a graphics exchange server through a persistent connection with the graphics exchange server.

The present techniques provided by the present disclosure offer many beneficial results. For example, under the present techniques, the graphics provider terminal, through a graphical interface provided by the Canvas specification, samples a graphic generated by a web browser of the graphics provider terminal based on the Canvas specification to obtain graphics information. The graphics provider terminal sends the message packet to the graphics exchange server through a persistent connection between the graphics provider terminal and the graphics exchange server. The graphics exchange server sends the graphics information to the graphics receiver terminal through a persistent connection between the graphics receiver terminal and the graphics exchange server. Thus, the present techniques use the persistent connection between terminals to achieve graphics information sharing without developing and downloading controls. The present techniques also allow cross-browser graphics transmission that solves the current technical problem of developing different controls for different browsers which consumes lots of manpower and resources. In addition, the present techniques also disclose graphics sharing generated by Canvas and fills a whitespace of graphics sharing technology under Canvas.

BRIEF DESCRIPTION OF THE DRAWINGS

To better illustrate embodiments of the present disclosure, the following is a brief introduction of figures to be used in descriptions of the embodiments. It is apparent that the following figures only relate to some embodiments of the present disclosure. A person of ordinary skill in the art can obtain other figures according to the figures in the present disclosure without creative efforts.

DETAILED DESCRIPTION

In order to solve the problem of current graphic sharing techniques that does not support cross-browser graphics transmission and leads to consuming lots of manpower and resources, the present disclosure discloses new graphic sharing techniques. The present graphic sharing techniques are capable of implementing graphic sharing without requiring graphic controls to be downloaded to the terminals. When conveniently and easily sharing graphics, the present techniques also achieve cross-browser graphic transmission without the problem of browser incompatibility.

The present techniques are described in detail below by reference to the accompanying FIGs.

Figure 1:
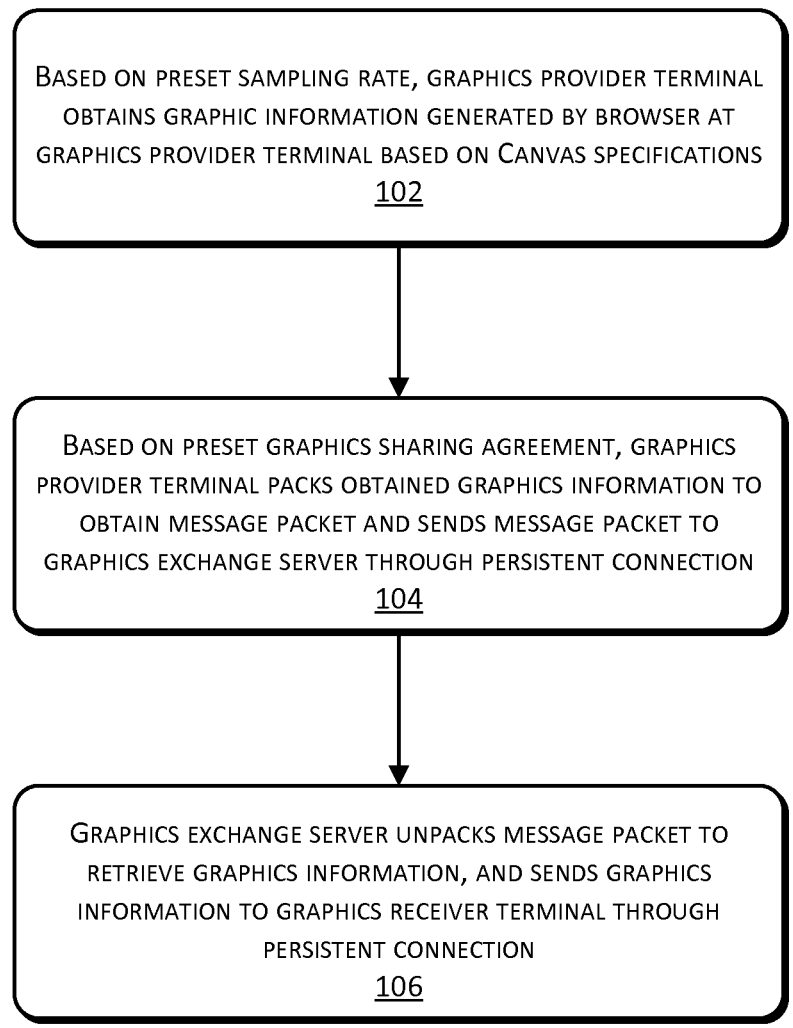
FIG. 1 illustrates a flowchart of an example method for graphic sharing in accordance with the present disclosure.

The example embodiments of the present disclosure provide a method for graphic sharing. FIG. 1 illustrates a flowchart of an example method for graphic sharing in accordance with the present disclosure.

At 102, based on the graphical interface provided by the Canvas specifications, the graphics provider terminal obtains the graphic information that is generated by the browser at the graphics provider terminal based on the Canvas specifications.

The graphic information may include any virtual visible graphics that can be generated based on the Canvas specifications. For example, such graphic information may be computer-generated images such as lines, circles, arcs, arbitrary curves and charts, etc.

After the graphics information has subsequently been shared between the graphics provider terminal and the graphics receiver terminal, the graphics receiver terminal may still need to display the graphics information. Thus, a total amount of graphics information per second provided by the graphics provider terminal to the graphics receiver terminal should satisfy a display screen refresh rate requirement of the graphics receiver terminal to ensure the quality to display the graphics information at the graphics receiver terminal.

For example, a sampling rate may be set based on the display screen refresh rate of the graphics receiver terminal which is contained in the handshake information sent by the graphics exchange server. The graphics provider terminal performs sampling of the graphics information based on the preset sampling rate. The sampling of the graphics information may include sampling the pixel points contained in the graphics information. For example, if the graphics information contains 1280×1024 pixel points, the display monitor of the graphics receiver terminal supports 1024×768 pixel points, and the display screen refresh rate of the graphics receiver terminal is 75 Hz, the following configurations need to be satisfied: performing sampling of graphics information that contains 1280×1024 pixel points per second, and obtaining the sampling rate of 75 graphics information that each contain 1024×768 pixel points.

At 104, based on the preset graphics sharing agreement (please refer to Table 1 below for details of the data/packet structure based on a preset graphics sharing agreement), the graphics provider terminal packs the obtained graphics information to obtain the message packet and sends the message packet to the graphics exchange server using a persistent connection between the graphics provider terminal and the graphics exchange server.

The graphics exchange server is a server to provide information exchange between the graphics provider terminal and graphics receiver terminal to achieve graphics information routing, packing and other functionalities based on the persistent connections with the graphics provider terminal and the graphics receiver terminal respectively. At 104, the graphics provider terminal sends the obtained graphics information to the graphics exchange server so that the graphics exchange server can complete the actions at step 106.

At 106, the graphics exchange server unpacks the message packet to retrieve the graphics information, and uses a persistent connection with the graphics receiver terminal to send the graphics information to the graphics receiver terminal.

In an example embodiment, when the browser of the graphics provider terminal supports interactive vector graphics and web animation standard (such as FLASH®, a software provided by Adobe corporation), if the graphics provider terminal intends to send the message packet to the graphics exchange server through the persistent connection, such persistent connection may be established by the FlashSocket interface that is provided by Flash-supported message communication standards. Alternatively, the message packet may be encoded by the Base64 encoding, the message packet is sent through the persistent connection established by the WebSocket interface that is provided by browser-supported message communication standards. The advantage of the former transmission approach is no need to perform Base64 encoding on the message packet, and thus the transmission rate is high; while the advantage of the latter transmission approach is no restriction on whether FLASH® is installed on the browser of the terminal, and thus the compatibility is high.

Similarly, when the graphics exchange server uses its persistent connection with the graphics receiver terminal to send the graphics information to the graphics receiver terminal, there are also multiple alternatives. When the graphics exchange server intends to send the graphics information to the graphics receiver terminal, it may first determine the message communication standard supported by the graphics receiver terminal from the handshake information sent by the graphics receiver terminal. If it is determined that the message communication standard supported by the graphics receiver terminal is a Flash-supported message communication standard, the graphics exchange server packs the graphics information into a message packet based on the preset graphics sharing agreement, and sends the message packet to the graphics receiver terminal using the persistent connection established by the FlashSocket interface that is provided by the Flash-supported message communication standard. If it is determined that the message communication standard supported by the graphics receiver terminal is a message communication standard supported by the browser at the graphics receiver terminal, the graphics exchange server packs the graphics information into a message packet based on the preset graphics sharing agreement, performs Base64 encoding on the message packet, and sends the encoded message packet to the graphics receiver terminal using the persistent connection established by the WebSocket interface that is provided by the browser-supported message communication standard.

Figure 2:
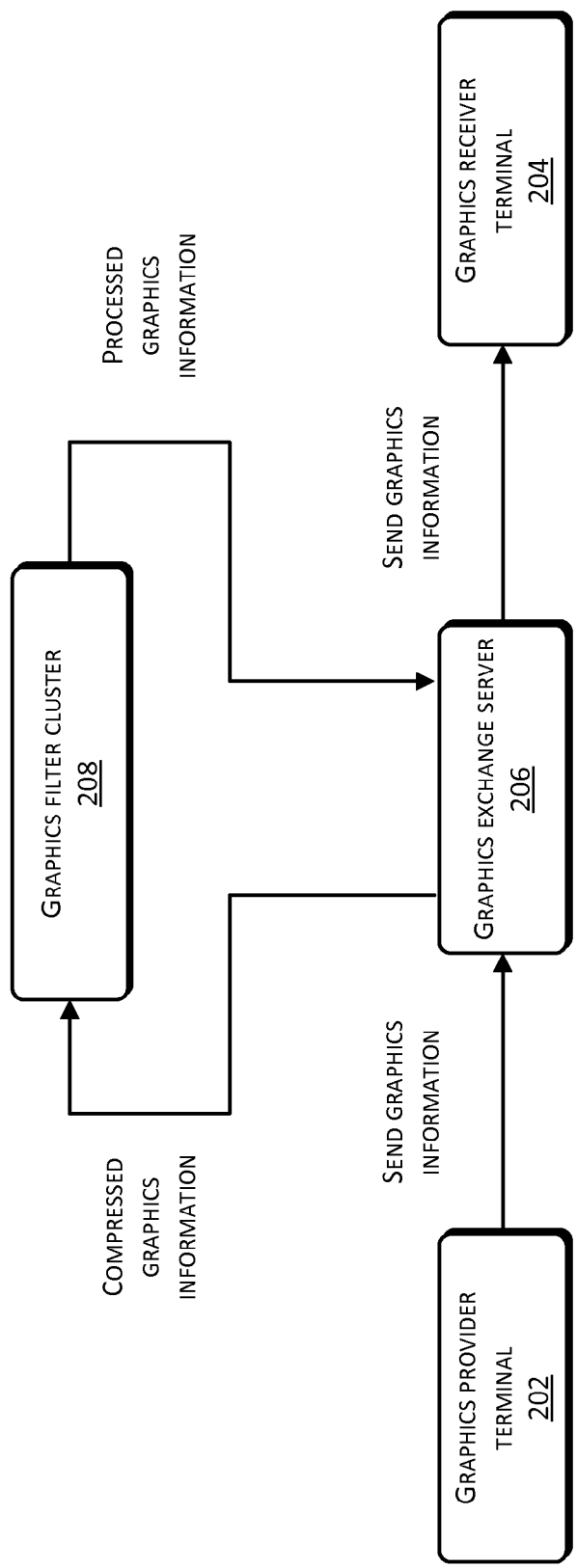
FIG. 2 illustrates a flowchart of an example system for graphic sharing in accordance with the present disclosure.

FIG. 2 illustrates a diagram for an example system to implement the example method for graphics sharing in according with the present disclosure. FIG. 2 shows a graphics provider terminal 202, a graphics receiver terminal 204, and a graphics exchange server 206 between the graphics provider terminal 202 and the graphics receiver terminal 204. The graphics provider terminal 202, the graphics receiver terminal 204, and the graphics exchange server 206 can cooperate to implement graphics sharing. For example, the graphics provider terminal 202 intends to transmit graphics information generated by its browser based on the Canvas specifications to the graphics receiver terminal 204 so that the graphics provider terminal 202 obtains the graphics information and send it to the graphics exchange server 206. The graphics exchange server 206 performs one or more operations, such as a compressing operation, on the received graphics information, and uses one or more graphics filtering clusters 208 to process the compressed graphics information (e.g. performing grayscale) to obtain the processed graphics information. Then the graphics exchange server 206 sends the processed graphics information to the graphics receiver terminal 204. The graphics receiver terminal 204 performs one or more operations such as a rendering operation on the graphics information. Thus the graphics information is shared between the graphics provider terminal 202 and the graphics receiver terminal 204 and is displayed at the graphics receiver terminal 204.

Figure 3:
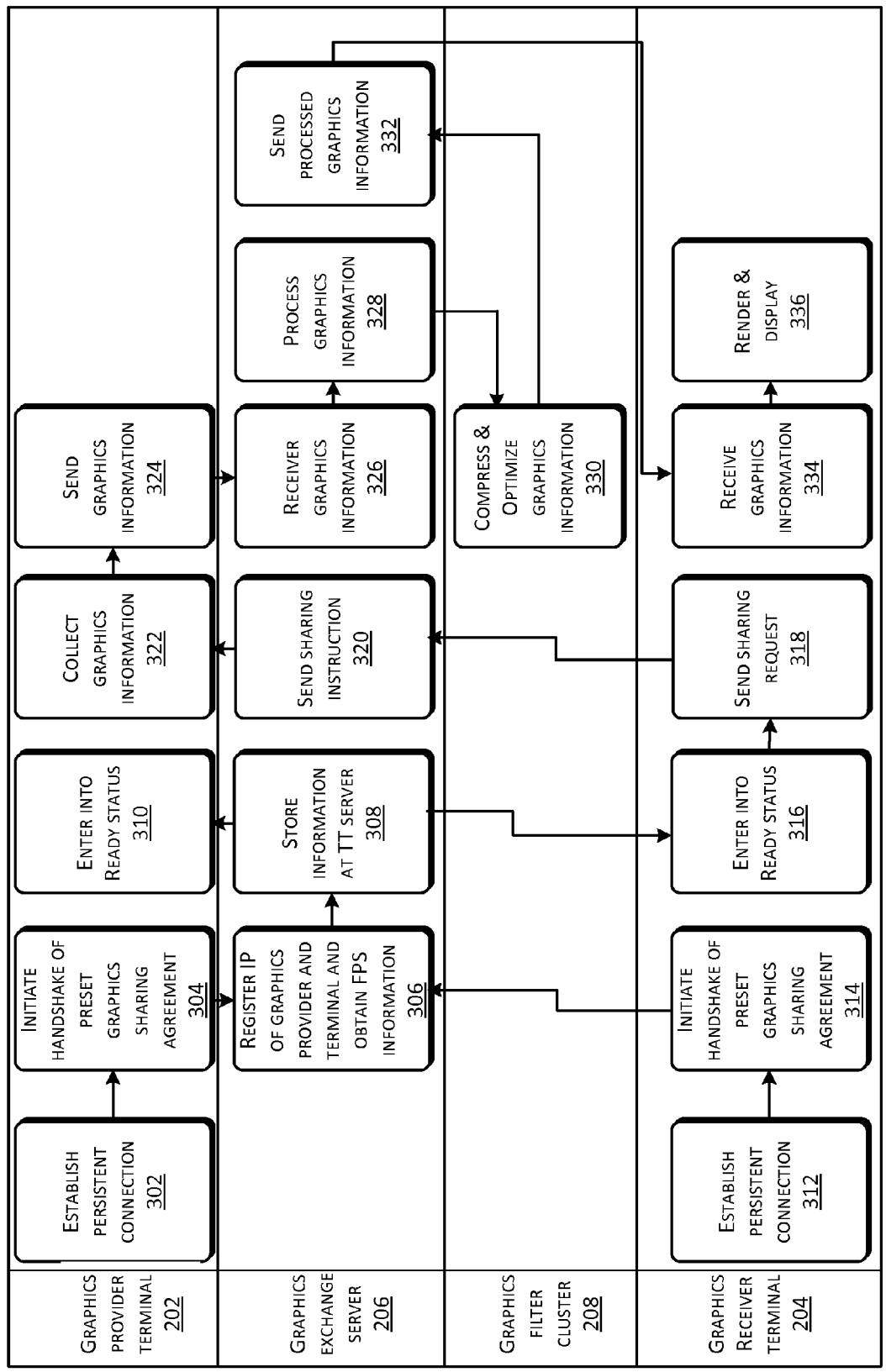
FIG. 3 illustrates a flowchart of an example method for graphic sharing in detail in accordance with the present disclosure.

The above actions may be further described as below. FIG. 3 illustrates a flowchart of an example method for graphic sharing in detail in accordance with the present disclosure.

At 302, the graphics provider terminal 202 establishes the persistent connection with the graphics exchange server 206.

At 304, the graphics provider terminal 202 initiates a handshake of the preset graphics sharing agreement (please see the Table 1 below for the packet structure of the graphics sharing agreement) with the graphics exchange server 206. At 306, the graphics exchange server 206 receives the handshake and registers the IP address information of the graphics provider terminal 202 and obtains the handshake information such as frame per second (FPS) of the graphics provider terminal 202.

At 308, the graphics exchange server 206 stores handshake information into a server such as a TokeyTyrant server (TT server). The TT Server is a type of high efficiency database system based on Key: Value (key value pair). The handshake information may include information such as the message communication standard supported by the graphics provider terminal 202, the screen refresh rate or FPS of the graphics provider terminal 202, etc.

The roles of the graphics provider terminal 202 and the graphics receiver terminal 204 are interchangeable. The graphics provider terminal 202 may also act as a graphic receiver terminal and the graphics receiver terminal 204 may also act as a graphics provider terminal. When the role of the graphics provider terminal 202 is changed to the graphics receiver terminal, its FPS can be used as a reference for the sampling rate by the corresponding graphics provider terminal. The message communication standard supported by the graphics provider terminal 202 can be used as a reference for the message communication standard that the graphics exchange server 206 uses to send the graphics information when the graphics provider terminal 202 acts as the graphics receiver terminal. After the handshake is successful, the graphics exchange server 206 sends feedback response to the graphics provider terminal.

At 310, the graphics provider terminal 202 enters into a ready status for graphic sharing. The graphics provider terminal 202 enters into the status for preparing to send graphics information.

At 312, the graphics receiver terminal 204 establishes a persistent connection with the graphics exchange server 206.

At 314, the graphics receiver terminal 204 initiates a handshake of the preset graphics sharing agreement with the graphics exchange server 206. The handshake information may include the message communication standard supported by the graphics receiver terminal 204, the FPS of the graphics receiver terminal 204, and formats of the graphics information supported by the graphics receiver terminal, etc.

At 316, after the handshake is successful, the graphics receiver terminal 204 enters into a ready status for graphic sharing. At 318, the graphics receiver terminal 204 sends a graphics information sharing request to the graphics exchange server 206 that requests to retrieve the graphics information generated by the graphics provider terminal 202 using the Canvas specifications.

At 320, the graphics exchange server 206 sends an instruction for graphic sharing to the graphics provider terminal 202.

The instruction for graphic sharing informs the graphics provider terminal 202 to open a channel for graphic sharing to transmit the graphics information.

At 322, the graphics provider terminal 202 collects the graphics information for graphic sharing. At 324, the graphics provider terminal 202 sends the graphics information to the graphics exchange server 206.

At 326, the graphics exchange server 206 receives the graphics information from the graphics provider terminal 202. At 328, the graphics exchange server 206 performs operations to process the received graphics information. For example, the graphics exchange server 206 may send the graphics information to one or more graphics filtering clusters 328. At 330, the graphics filtering clusters 328 performs one or more operations on the graphics information such as compressing and optimizing the graphics information. After the graphics information has been processed by the graphics filtering clusters 328, the graphics filtering clusters 328 send the processed graphics information to the graphics exchange server 206. (In some other examples, based on the actual scenarios, the graphics exchange server 206 may not send the graphics information to the graphics filtering clusters 208 for processing.)

At 332, the graphics exchange server 206 sends the processed graphics information to the graphics receiver terminal 204.

At 334, the graphics receiver terminal 204 receives the graphics information. At 336, the graphics receiver terminal 204 renders and displays the graphics information.

TABLE 1

Graphics Information

| Packet Header | |
|---|---|
| MSG_TYPE | 0x01 (Handshake) |
| | 0x02 (Data) |
| | 0x01 (Farewell) |
| FMT: | Bitmap Data File Format |
| Attrs: | String\|String (Length attribute is required, and the end of the Attrs header is represented by using two \0) |
| BODY | |

In some example embodiments, WebSocket or FlashSocket may be used to maintain the persistent connection between the graphics provider terminal 202 and the graphics exchange sever 206, and the persistent connection between the graphics receiver terminal 204 and the graphics exchange server 206. The persistent connections act as the channels for the transmission of graphics information. The following two example embodiments illustrate the scenarios based on FlashSocket or WebSocket respectively.

Figure 4:
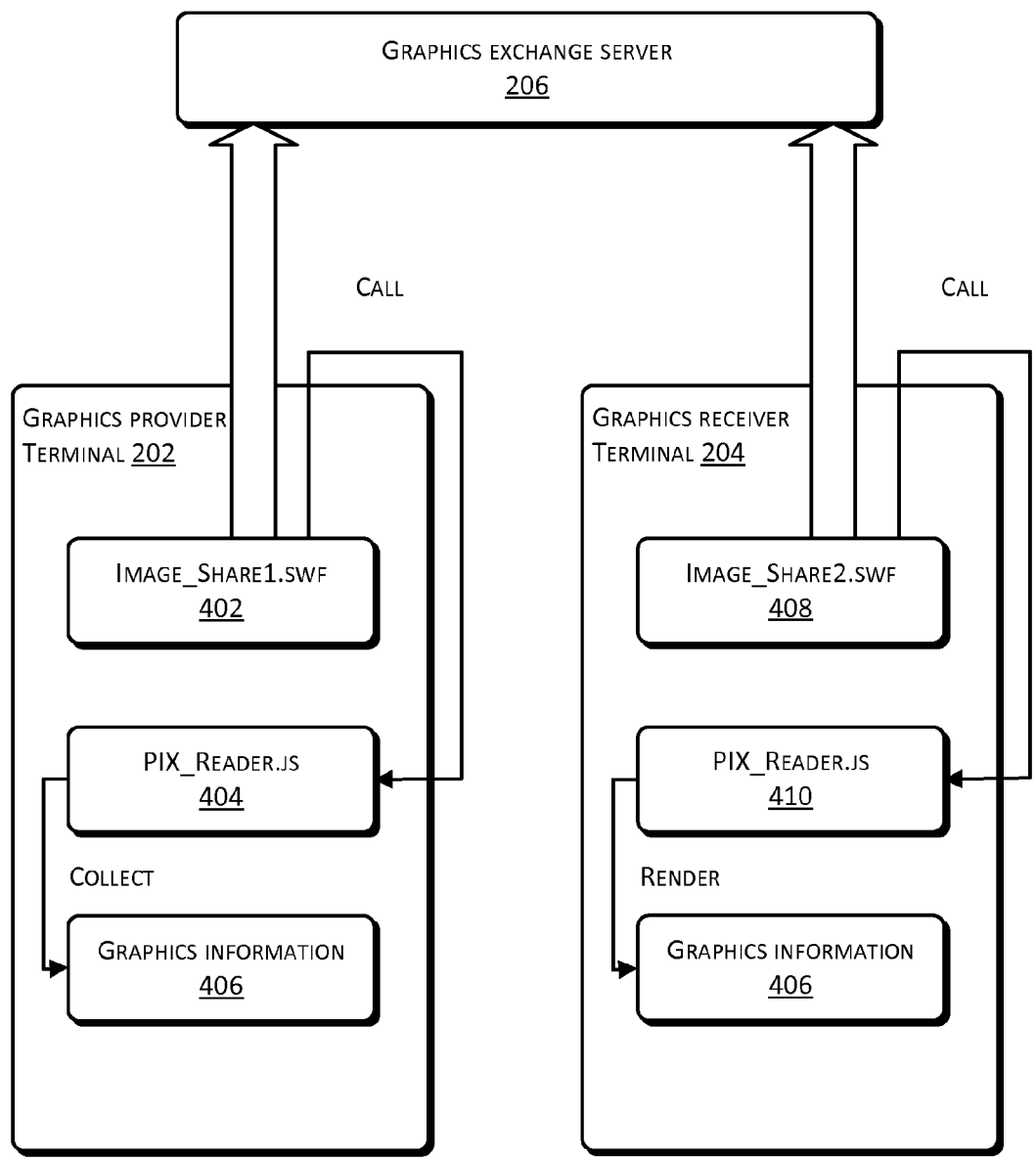
FIG. 4 illustrates an example flowchart of graphic sharing flow under a high-speed mode.

A first example embodiment is illustrated below in detail. The first example embodiment focuses on the scenario where FLASH® is installed on the browsers of the terminals that share the graphics information. The graphics sharing mode under this scenario may also be referred to as "high-speed mode." FIG. 4 illustrates an example flowchart of graphic sharing flow under the high-speed mode.

A graphic sharing program such as Image_Share1.swf 402, which is used to call a pixel reader program such as PIX_Reader.js 404 at the graphics provider terminal 202, according to the FPS of the graphics receiver terminal 204, uses the Timer in the Flash to call the graphics information sampling method in the PIX_Reader.js 404. (For example, the method is called ReaderCanvas.) The FPS is received from the graphics exchange server 206 when the graphics provider terminal 202 performs the handshake with the graphic exchange server 206.

The PIX_Reader.js 404 calls Canvas API to read and/or collect the graphics information 406 generated based on the Canvas specifications, and then returns the read graphics information to Image_Share1.swf 402 in a data format such as array.

The Image_Share1.swf 402, based on the preset graphics sharing agreement, packs the graphics information into the graphics sharing agreement packet. If FLASH® is installed on the browser of the graphics provider terminal 202, the graphics provider terminal 202 uses the persistent connection established based on the FlashSocket to send the graphics sharing agreement pack to the graphics exchange server 206.

The graphics exchange server 206 retrieves the graphics information 406 from the graphics sharing agreement packet and performs processing, such as gray scaling, onto the graphics information 406. If the graphics exchange server 206, based on the handshake information with the graphics receiver terminal 204, acknowledges that the browser at the graphics receiver terminal 204 also installs the FLASH®, the graphics exchange server 206 packs the processed graphics information 406 into a graphics sharing agreement packet and uses the persistent connection established based on the FlashSocket to send the graphics sharing agreement packet to the graphics receiver terminal 204.

After receiving the graphics sharing agreement packet, the graphics receiver terminal 204 may perform one or more processing operations on the graphics information 406, such as using Image_Share2.swf 408 to unpack the graphics sharing agreement packet to obtain the graphics information 406, and calling PIX_Reader.js 410 to store the graphics information 406 into an array for graphics information data.

The graphics receiver terminal 204 uses the PIX_Reader.js 410 to call the Canvas API to finish rendering and displaying the graphics information 406.

Figure 5:
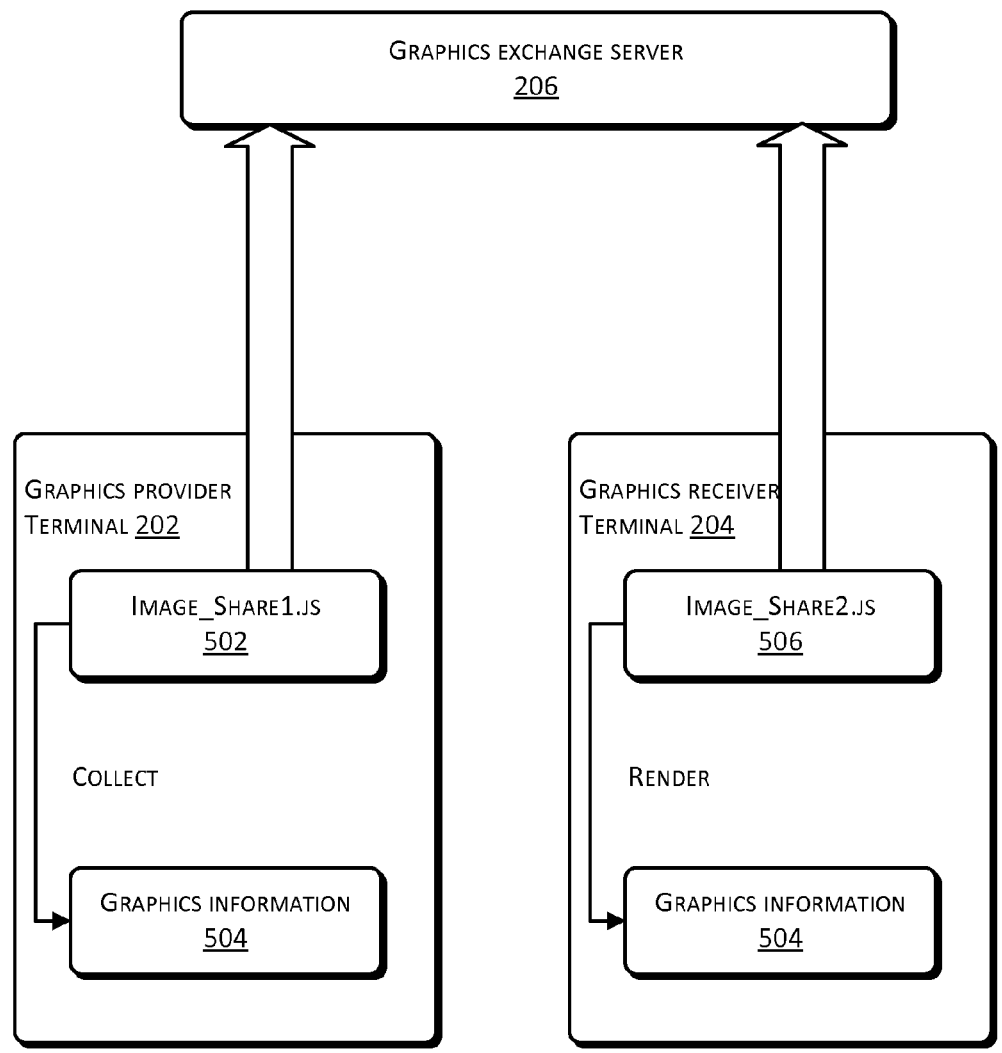
FIG. 5 illustrates an example flowchart of graphic sharing flow under a high-speed mode.

A second example embodiment is also illustrated below in detail. The second example embodiment focuses on the scenario where FLASH® is not installed on the browsers of the terminals that share the graphics information. The graphics sharing mode under this scenario may also be referred to as "compatible mode," which is different from the "high-speed mode" as described above. As the browsers of the terminals under the "compatible mode" do not install the FLASH®, there does not exist FlashSocket and Timer. Instead, WebSocket and thread such as Worker are used to implement corresponding functionalities. FIG. 5 illustrates an example flowchart of graphic sharing flow under the high-speed mode.

A thread in the graphics provider terminal 202 calls a program, such as Image-Share1.js 502, that samples graphics information 504. The thread may be Worker. The Image_Share1.js 502 samples the graphics information 504 generated based on the Canvas specifications, according to the FPS of the graphics receiver terminal 204 that is sent by the graphics exchange server 206 when the graphics provider terminal 202 performs a handshake with the graphics exchange server 206.

The Image-Share1.js 502, based on the preset graphics sharing agreement, packs the graphics information 504 into a graphics sharing agreement packet. As the browser of the graphics provider terminal 202 does not install the FLASH®, the graphics provider terminal 202 performs a Base64 encoding on the graphics sharing agreement packet, and then transmits it to the graphics exchange server 206 through a persistent connection established based on WebSocket.

The graphics exchange server 206 retrieves the graphics information 504 from the graphics sharing agreement packet and performs processing, such as gray scaling, on the graphics information 504. If the graphics exchange server 206, based on the handshake information with the graphics receiver terminal 204, acknowledges that the browser at the graphics receiver terminal 204 does not have FLASH® installed, the graphics exchange server 206 packs the processed graphics information 504 into a graphics sharing agreement packet, performs a Base64 encoding on the graphics sharing agreement packet, and uses a persistent connection established based on WebSocket to send the graphics sharing agreement packet to the graphics receiver terminal 204.

After receiving the graphics sharing agreement packet, the graphics receiver terminal 204 performs one or more operations on the graphics sharing agreement packet, such as using Image_Share2.js 506 to unpack the graphics sharing agreement packet to obtain the graphics information 504.

The graphics receiver terminal 204 calls the Canvas API to finish rendering and displaying the graphics information 504.

As shown from the first example embodiment and the second example embodiment, the graphic sharing process is similar under the high-speed mode and the compatible mode. One difference is that, under the compatible mode, the persistent connection established based on WebSocket is still not capable of sending binary data, the graphics sharing agreement packet needs to be encoded by the Base64 encoding for transmission, thereby influencing the information transmission efficiency. Thus, compared with the compatible mode, the transmission efficiency under the high-speed mode is higher with a pre-requisite that FLASH® is installed on at least one terminal.

Figure 6:
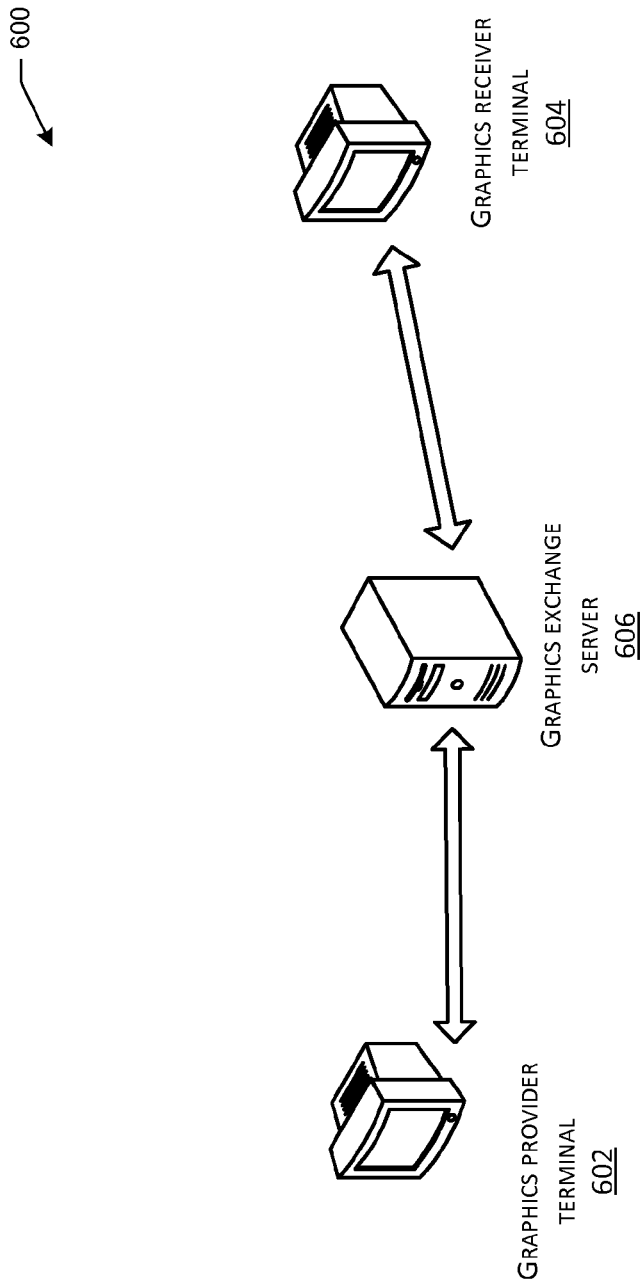
FIG. 6 illustrates an example system for graphic sharing.

Corresponding to the method for graphic sharing in the present disclosure, the present disclosure also discloses a system for graphic sharing. FIG. 6 illustrates an example system 600 for graphic sharing. The system 600 includes a graphics provider terminal 602, a graphics receiver terminal 604, and a graphics exchange server 606.

According to a preset sampling rate, the graphics provider terminal 602, through a graphical interface provided by the Canvas specification, samples a graphic generated by a web browser of the graphics provider terminal 602 based on the Canvas specification to obtain graphics information. The graphics provider terminal 602, based on a preset graphics sharing agreement, packs the obtained graphics information to obtain a message packet, and then sends the message packet to the graphics exchange server 606 through a persistent connection between the graphics provider terminal 602 and the graphics exchange server 606.

The graphics exchange server 606 unpacks the message packet to retrieve the graphics information, and sends the graphics information to the graphics receiver terminal 604 through a persistent connection between the graphics receiver terminal 604 and the graphics exchange server 606.

For example, a sampling rate may be set by the graphics provider terminal 602 based on the display screen refresh rate of the graphics receiver terminal 604 which is contained in the handshake information sent by the graphics exchange server 606. If the graphics receiver terminal 604 does not need to display the graphics, there is no need to set up the sampling rate based on the frequency refresh rate of the graphics receiver terminal 604. In one example embodiment, when the browser of the graphics provider terminal 602 has supported interactive vector graphics and web animation standard such as Flash, the graphics provider terminal 602 sends the message packet to the graphics exchange server 606 by using the persistent connection. The graphics provider terminal 602 uses the persistent connection established by the FlashSocket interface, which is provided by Flash-supported message communication standards, to send the message packet to the graphics exchange server 606.

Alternatively, the graphics provider terminal 602 may send the message packet to the graphics exchange server 606 using the persistent connection in accordance with another approach. For example, after the graphics provider terminal 602 encodes the message packet, it uses the persistent connection established by the WebSocket interface, which is provided by browser-supported message communication standards, to send the message packet to the graphics exchange server 606.

The graphics exchange server 606 may use its persistent connection with the graphics receiver terminal 604 to send the graphics information to the graphics receiver terminal 604.

For example, the graphics exchange server 606 determines the message communication standard supported by the graphics receiver terminal 604 from the handshake information sent by the graphics receiver terminal 604. If it is determined that the message communication standard supported by the graphics receiver terminal 604 is the Flash-supported message communication standard, the graphics exchange server packs the graphics information into a message packet based on the preset graphics sharing agreement, and sends the message packet to the graphics receiver terminal 604 by using the persistent connection established by the FlashSocket interface that is provided by the Flash-supported message communication standard. If it is determined that the message communication standard supported by the graphics receiver terminal 604 is a message communication standard supported by the browser at the graphics receiver terminal 604, the graphics exchange server 606 packs the graphics information into a message packet based on the preset graphics sharing agreement, performs encoding, such as Base64 encoding, on the message packet, and sends the encoded message packet to the graphics receiver terminal 604 by using the persistent connection established by the WebSocket interface that is provided by the browser-supported message communication standard.

Figure 7:
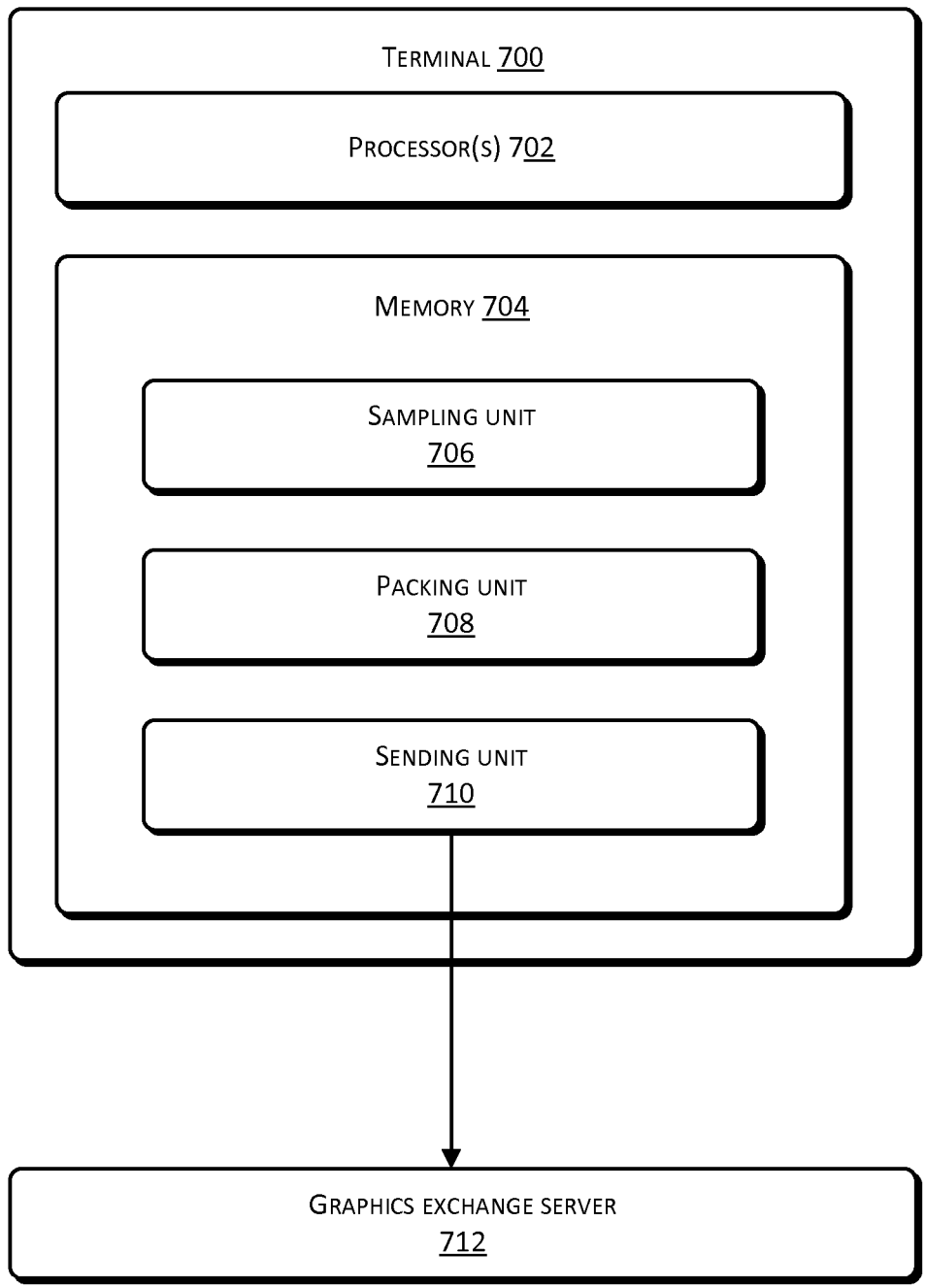
FIG. 7 illustrates a structure diagram of an example terminal.

The present disclosure also provides a terminal FIG. 7 illustrates a structure diagram of an example terminal 700. The terminal 700 may include, but is not limited to, one or more processors 702 and memory 704. The memory 704 may include computer storage media in the form of volatile memory, such as random-access memory (RAM) and/or non-volatile memory, such as read only memory (ROM) or flash RAM. The memory 704 is an example of computer storage media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include transitory media such as modulated data signals and carrier waves.

The memory 704 may store therein program units or modules and program data. In one embodiment, the units may include a sampling unit 706, a packing unit 708, and a sending unit 710. These units may therefore be implemented in software that can be executed by the one or more processors 702. In other implementations, the units may be implemented in firmware, hardware, software, or a combination thereof.

According to a preset sampling rate, the sampling unit 706, through a graphical interface provided by the Canvas specification, samples a graphic generated by a web browser of a graphics provider terminal based on the Canvas specification to obtain graphics information.

Based on a preset graphics sharing agreement, the packing unit 708, packs the graphics information obtained by the sampling unit 706 to obtain a message packet.

The sending unit 710 sends the message packet to a graphics exchange server 712 through a persistent connection between the terminal 700 and the graphics exchange server 712.

When the web browser supports interactive vector graphics and web animation standard such as the Flash, the sending unit 710 may send the message packet to the graphics exchange server by using a persistent connection established by a FlashSocket interface, which is provided by the Flash-supported message communication standard.

Alternatively, the sending unit 710 may encode the message packet, and uses a persistent connection established by the WebSocket interface, which is provided by the browser-supported message communication standard, to send the message packet to the graphics exchange server 712.

From the example embodiments described above, one of ordinary skill in the art can clearly understand that the disclosed method and system may be implemented using software and universal hardware platform. Based on this understanding, the technical scheme of the present disclosure, or portions contributing to existing technologies, may be implemented in the form of software products which are stored in computer storage media such as ROM/RAM, hard drive and optical disk. The software includes computer-executable instructions for a computing device (e.g., personal computer, server or networked device) to execute the method described in the example embodiments of the present disclosure.

The various example embodiments are progressively described in the present disclosure. Same or similar portions of the example embodiments can be mutually referenced. Each example embodiment has a different focus than other example embodiments. In particular, the example device embodiment has been described in a relatively simple manner because of its fundamental correspondence with the example method. Details thereof can be found with reference to related portions of the example method. Descriptions of the above example device are meant for illustrative purpose only. Units or modules described as separate components therein may or may not be physically separated. The modules or units described in the embodiments may be merged into one module or be further divided into multiple sub-modules. One or more modules or units described in one embodiment may be merged into another embodiment. Components illustrated in terms of units or modules may or may not be physical units, e.g., may be located in one place or may be distributed among multiple network units. Depending on the actual needs, the goal of the example embodiments may be achieved by selecting parts or all of the modules. One of ordinary skill in the art can understand and implement the disclosed system without any innovative effect.

The present disclosure is described by reference to the flowcharts and diagrams of the method, apparatus (system), and computer software product of the present disclosure. It can be understood that computer-executable instructions can implement each flowchart and/or diagram of the figures, or a combination thereof. Such computer-executable instructions can be embedded into a general-purpose computer, a special-purpose computer, an embedded device or any other programmable data processing device to implement a machine that can use the instructions executed by the computer or other programmable data processing device to realize functions designated by one or more flow processes of the flowchart figures and/or one or more diagrams of the diagram figures.

Such computer-executable instructions may also be loaded into the computer or any other programmable data processing device such that the computer or the programmable data processing device can perform a plurality of operation steps to realize functions by operation of such computer. Thus, the computer-executable instructions performed at the computer or any other programmable data processing device implement functions designated by one or more flow processes of the flowchart figures and/or one or more diagrams of the diagram figures.

The present disclosure may be described within a general context of computer-executable instructions executed by a computer, such as a program module. Generally, a program module includes routines, programs, objects, modules, data structure, computer-executable instructions etc., for executing specific tasks or implementing specific abstract data types. The disclosed method and device may also be implemented in a distributed computing environment. In the distributed computing environment, a task is executed by remote processing devices which are connected through a communication network. In distributed computing environment, the program modules may be located in computer storage media (which include storage devices) of local and/or remote computers.

The disclosed method and system may be used in an environment or in a configuration of universal computer systems with software or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

Above are example embodiments of the present disclosure. However, the present disclosure is not limited hereto. The terminologies used herein are for illustration purposes, and not for limiting the present disclosure. Since the present disclosure can be specifically implemented using many forms without deviating from the spirit or essence of the invention, the above example embodiments are not limited to the details discussed above, and should be broadly interpreted under the essence and scope defined in the claims. It is to be appreciated that one of ordinary skill in the art may alter or modify the present disclosure in many different ways without departing from the spirit and the scope of this disclosure. These modifications and variations should therefore be considered to fall within the scope of the claims of the present disclosure and their equivalents.

What is claimed is:

1. A method performed by one or more processors configured with computer-executable instructions, the method comprising:

setting, by a graphics provider terminal, a preset sampling rate based on a frequency refresh rate of a graphics receiver terminal that is sent by a graphics exchange server;

sampling, by the graphics provider terminal through a graphical interface provided by a Canvas specification, a graphic generated by a web browser of the graphics provider terminal based on the Canvas specification to obtain graphics information according to the preset sampling rate;

packing, by the graphics provider terminal, the graphics information to obtain a message packet based on a preset graphics sharing agreement;

sending, by the graphics provider terminal, the message packet to the graphics exchange server through a persistent connection between the graphics provider terminal and the graphics exchange server;

unpacking, by the graphics exchange server, the message packet to obtain the graphics information;

processing, by the graphics exchange server, the graphics information;

packing, by the graphics exchange server, the graphics information into another message packet;

determining, by the graphics exchange server, a message communication standard supported by the graphics receiver terminal based on handshake information sent by the graphics receiver terminal; and sending, by the graphics exchange server, the another message packet to the graphics receiver terminal through a persistent connection between the graphics receiver terminal and the graphics exchange server.

2. The method as recited in claim 1, wherein the web browser supports an interactive vector graphic and a web animation standard.

3. The method as recited in claim 2, wherein the sending, by the graphics provider terminal, the message packet to the graphics exchange server through the persistent connection between the graphics provider terminal and the graphics exchange server comprises:
establishing the persistent connection between the graphics provider terminal and the graphics exchange server through an interface that is provided by a message communication standard supported by the web animation standard.

4. The method as recited in claim 1, wherein the sending, by the graphics provider terminal, the message packet to the graphics exchange server through the persistent connection between the graphics provider terminal and the graphics exchange server comprises:
encoding, by the graphics provider terminal, the message packet; and
establishing the persistent connection between the graphics provider terminal and the graphics exchange server through an interface that is provided by a browser-supported message communication standard.

5. The method as recited in claim 1, wherein the graphics provider terminal and the graphics receiver terminal are interchangeable.

6. The method as recited in claim 1, further comprising:
in response to determining that the message communication standard is a communication standard supported by a web animation standard, establishing the persistent connection between the graphics receiver terminal and the graphics exchange server through an interface that is provided by the message communication standard supported by the web animation standard.

7. The method as recited in claim 1, further comprising:
in response to determining that the message communication standard is a browser-supported message communication standard,
encoding the another message packet; and
establishing the persistent connection between the graphics receiver terminal and the graphics exchange server through an interface that is provided by the browser-supported message communication standard.

8. The method as recited in claim 1, wherein the frequency refresh rate of the graphics receiver terminal is included in handshake information sent by the graphics exchange server to the graphics provider terminal.

9. The method as recited in claim 1, wherein the determining, by the graphics exchange server, the message communication standard supported by the graphics receiver terminal based on the handshake information sent by the graphics receiver terminal comprises:
in response to determining that the message communication standard is a Flash-supported communication standard, establishing the persistent connection between the graphics receiver terminal and the graphics exchange server through a FlashSocket interface.

10. The method as recited in claim 1, wherein the determining, by the graphics exchange server, the message communication standard supported by the graphics receiver terminal based on the handshake information sent by the graphics receiver terminal comprises:
in response to determining that the message communication standard is a browser-supported message communication standard, establishing the persistent connection between the graphics receiver terminal and the graphics exchange server through a WebSocket interface that is provided by the browser-supported message communication standard.

11. The method as recited in claim 1, wherein the graphics provider terminal includes the web browser.

12. A system comprising:
a graphics exchange server including one or more processors and memory; and
a graphics provider terminal that:
sets a preset sampling rate based on a frequency refresh rate of a graphics receiver terminal that is sent by the graphics exchange server;
samples, through a graphical interface provided by a Canvas specification, a graphic generated by a web browser of the graphics provider terminal based on the Canvas specification to obtain graphics information according to the preset sampling rate;
packs the graphics information to obtain a message packet based on a preset graphics sharing agreement; and
sends the message packet to the graphics exchange server through a persistent connection between the graphics provider terminal and the graphics exchange server,
wherein the graphics exchange server:
unpacks the message packet to obtain the graphics information;
processes the graphics information;
packs the graphics information into another message packet;
determines a message communication standard supported by the graphics receiver terminal based on handshake information sent by the graphics receiver terminal; and
sends the another message packet to the graphics receiver terminal through a persistent connection between the graphics receiver terminal and the graphics exchange server.

13. The system as recited in claim 12, wherein the graphic provider terminal further establishes the persistent connection between the graphics provider terminal and the graphics exchange server through an interface that is provided by a message communication standard supported by a web animation standard that is supported by the web browser.

14. The system as recited in claim 12, wherein the graphics provider terminal further establishes the persistent connection between the graphics provider terminal and the graphics exchange server through an interface that is provided by a browser-supported message communication standard.

15. The system as recited in claim 12, wherein the graphics provider terminal further determines that the message communication standard is a communication standard supported by a web animation standard, and establishes the persistent connection between the graphics provider terminal and the graphics exchange server through an interface that is provided by the message communication standard supported by the web animation standard.

16. The system as recited in claim 12, wherein the graphics provider terminal further determines that the message communication standard is a browser-supported message communication standard and establishes the persistent connection between the graphics receiver terminal and the graphics exchange server through an interface that is provided by the browser-supported message communication standard.

17. The system as recited in claim 12, wherein the frequency refresh rate of the graphics receiver terminal is included in handshake information sent by the graphics exchange server to the graphic provider terminal.

18. The system as recited in claim 12, wherein the graphics provider terminal includes the web browser.

19. One or more memories having stored thereon computer-executable instructions that are executable by one or more processors to perform actions comprising:
   setting a preset sampling rate based on a frequency refresh rate of a graphics receiver terminal that is sent by a graphics exchange server;
   sampling, through a graphical interface provided by a Canvas specification, a graphic generated by a web browser of the graphics provider terminal based on the Canvas specification to obtain graphics information according to the preset sampling rate;
   packing the graphics information to obtain a message packet based on a preset graphics sharing agreement;
   sending the message packet to the graphics exchange server through a persistent connection between the graphics provider terminal and the graphics exchange server;
   unpacking the message packet to obtain the graphics information;
   processing the graphics information;
   packing the graphics information into another message packet;
   determining a message communication standard supported by the graphics receiver terminal based on handshake information sent by the graphics receiver terminal; and
   sending the another message packet to the graphics receiver terminal through a persistent connection between the graphics receiver terminal and the graphics exchange server.

20. The one or more memories as recited in claim 19, wherein the graphics provider terminal includes the web browser.

* * * * *